United States Patent
Balinsky et al.

(10) Patent No.: US 11,356,249 B2
(45) Date of Patent: Jun. 7, 2022

(54) REGULATING MODIFICATION

(71) Applicant: Hewlett-Packard Development Company, L.P., Spring, TX (US)

(72) Inventors: Helen Balinsky, Bristol (GB); Chris Dalton, Bristol (GB); Joshua Serratelli Schiffman, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,532

(22) PCT Filed: Jan. 2, 2018

(86) PCT No.: PCT/US2018/012076
§ 371 (c)(1),
(2) Date: Apr. 30, 2020

(87) PCT Pub. No.: WO2019/135734
PCT Pub. Date: Jul. 11, 2019

(65) Prior Publication Data
US 2021/0218554 A1   Jul. 15, 2021

(51) Int. Cl.
*H04L 9/08* (2006.01)
*H04L 9/32* (2006.01)

(52) U.S. Cl.
CPC .......... *H04L 9/0819* (2013.01); *H04L 9/3218* (2013.01); *H04L 9/3263* (2013.01); *H04L 2209/38* (2013.01)

(58) Field of Classification Search
CPC ... H04L 9/0819; H04L 9/3218; H04L 9/3263; H04L 2209/38
See application file for complete search history.

(56) References Cited

U.S. PATENT DOCUMENTS

| | | | |
|---|---|---|---|
| 8,458,462 B1* | 6/2013 | Hanna | H04L 63/10 726/10 |
| 9,635,000 B1 | 4/2017 | Muftic | |
| 2003/0055994 A1* | 3/2003 | Herrmann | H04L 63/0263 709/229 |
| 2009/0154708 A1* | 6/2009 | Kolar Sunder | H04L 63/0435 380/279 |
| 2016/0275461 A1* | 9/2016 | Sprague | H04L 63/126 |
| 2017/0103391 A1 | 4/2017 | Wilson, Jr. et al. | |

(Continued)

FOREIGN PATENT DOCUMENTS

| CN | 105827410 | 8/2016 |
|---|---|---|
| EP | 2731043 | 5/2014 |
| WO | WO-2017147696 A1 | 9/2017 |

OTHER PUBLICATIONS

Alkan, C.V. Decentralized Objective Consensus without Proof-of-Work, Feb. 5, 2017, https://hackernoon.com/decentralized-objective-consensus-without-proof-of-work-a983a0489f0a.

(Continued)

*Primary Examiner* — Darshan I Dhruv
(74) *Attorney, Agent, or Firm* — HP Inc. Patent Department

(57) ABSTRACT

A method for regulating modification of a distributed digital ledger at a node comprises controlling access to a cryptographic key used to enable modification of the distributed digital ledger according to a policy maintained by at least one owner of the distributed digital ledger.

14 Claims, 3 Drawing Sheets

(56) References Cited

U.S. PATENT DOCUMENTS

| | | | |
|---|---|---|---|
| 2017/0232300 A1 | 8/2017 | Tran et al. | |
| 2017/0236094 A1* | 8/2017 | Shah | H04L 9/3236 |
| | | | 705/300 |
| 2017/0345105 A1 | 11/2017 | Isaacson et al. | |
| 2018/0183586 A1* | 6/2018 | Bhargav-Spantzel | ................... |
| | | | G06F 21/32 |
| 2018/0276666 A1* | 9/2018 | Haldenby | H04L 9/3271 |
| 2018/0300471 A1* | 10/2018 | Jain | H04L 63/105 |
| 2018/0337771 A1* | 11/2018 | Baker | H04L 63/061 |
| 2019/0130190 A1* | 5/2019 | Raspotnik, Jr. | H04L 63/08 |
| 2019/0149337 A1* | 5/2019 | Savanah | G06Q 20/3678 |
| | | | 713/168 |
| 2019/0179951 A1* | 6/2019 | Brunet | G06F 16/2365 |
| 2019/0372779 A1* | 12/2019 | Monica | H04L 9/0877 |
| 2021/0083856 A1* | 3/2021 | Daniel | H04L 9/0643 |
| 2021/0099299 A1* | 4/2021 | Daniel | H04L 9/3247 |

OTHER PUBLICATIONS

Cachin, C., Blockchain, Cryptography, and Consensus, Jun. 2017, https://www.zurich.IBM.com/~cca/talks/20170622-blockchain-ice.pdf.

NEM Technical Reference, May 15, 2015, https://nem.io/NEM_techRef.pdf.

Zindros, Dionysis. "A Pseudonymous Trust System for a Decentralized Anonymous Marketplace", Jun. 23, 2014, https://gist.github.com/dionyziz/e3b296861175e0ebea4b.

* cited by examiner

REGULATING MODIFICATION

BACKGROUND

A distributed digital ledger can be used to record information in blocks that are cryptographically linked to one another such that the data in any given block cannot be retroactively changed without the modification of all subsequent blocks, thereby providing an inherent resistance to modification. Multiple nodes in a network can have a copy of the digital ledger and modification at any one node can be validated at each other node of the network.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1:
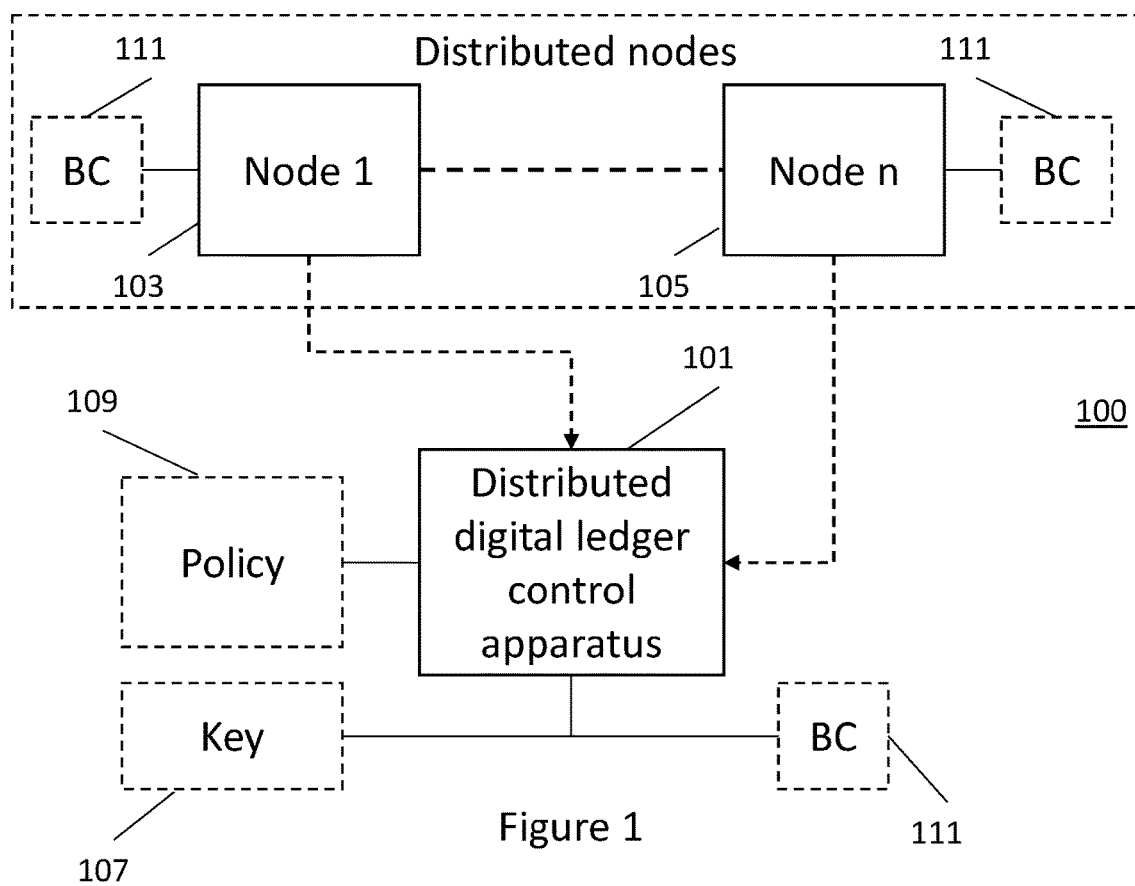
FIG. 1 is a schematic representation of a system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

An example of a distributed digital ledger is a blockchain, in which a list of records of transactions, forming blocks, continuously grows. Each block includes a pointer to a previous block in the form of a hash. Modification of a block, such as to record a new transaction for example, can be effected by a node providing it has access to a cryptographic key that is used for this purpose. Accordingly, providing a node knows the key, it can modify the blockchain.

Concepts such as 'proof-of-work' can be used in order to enable such operations to be carried out on the blockchain in a de-centralized fashion by arbitrary nodes. That is, control over blockchain operations is implicit: any one node can attempt to add blocks to the chain but ultimately only transactions/blocks that achieve consensus will survive and the work involved in falsifying a transaction is purposely significant. In financial blockchains for example, proof-of-work protocols are competitions, selecting and rewarding a winner with an ability to add a transaction or a block to a blockchain. Trust is established through repetitive community check and acceptance of a new updated blockchain.

According to an example, a mechanism to remotely establish trust (or not) in nodes and thus use those established properties as a way of gating access to operations on a distributed digital ledger is provided. Thus, it is possible to enforce (e.g. consortium agreed perhaps) policies over operations on a node using establishment of trust mechanisms for that node and the environment on that node where operations will be carried out. That is, a distributed digital ledger can be maintained and updated by secure, dedicated and isolated hardware and can be trusted without extensive community checks.

For example, a consortium may decide that writes of a new block to a distributed digital ledger can be carried out by an isolated hardware protected element (where the cryptographic key used to identify the block writer does not leave that hardware protected element for example). Accordingly, safety in this case is not achieved through the amount of work required to falsify transactions but through confidence that parties that can carry out sensitive operations will uphold policy requirements set by the owning consortium. The mechanisms proposed allow control over the amount of trust that should be placed in nodes that can carry out particular operations.

In an example, there is provided a flexible way of distributing trust to nodes in a network based on a variety of policy criteria. For example, in some cases, a policy may specify that a particular version of an Operating System is executing on a node that is attempting to modify a digital ledger. In a somewhat tighter configuration, a policy may specify that any system performing digital ledger operations is to be utilizing both boot time and runtime firmware, OS and application integrity checks along with hosting the digital ledger code within a hardware supported isolated enclave.

According to an example, a policy over which nodes can carry out (what) operations on a distributed digital ledger and the conditions to be upheld in order for those operations to be considered valid is provided. The conditions of such a policy can include one or more of (but are not limited to):

the integrity of a stack of components on a remote platform (node) that form the environment and machine-readable executable instructions for carrying out the (distributed) operations;

regulation over the establishment and use of sensitive cryptographic material used in generating transactions, for example that an identity credential should reside and be used within a protected hardware environment;

a verification (acceptable to the policy) of the configuration of a remote platform used for carrying out remote operations;

a verification of the configuration of information flow control rules between elements of the node such as between a main processor and a hardware based functional accelerator:

more generally, that rules of the distributed digital ledger, access control and generic validity of transactions be hardware enforced.

In an example, the enforcement of such conditions can be through (though not limited to) use of platform assurance technologies such as trusted platform module (TPM)-based remote attestation combined with enhanced isolation and non-interference mechanisms such as OS-level compartmentalization allied with continuous runtime integrity and reporting mechanisms.

According to an example, enforcement of trusted node execution requirements can be accomplished in several ways. For example, a node can embed an attestation of its execution state into a transaction without validating that requirements of a policy have been met. Peers (nodes) on the network can then determine whether the attestation satisfies the consortium's requirements before accepting the transaction as valid In another example, hardware manufacturers and OEMs can control the conditions under which their components are produced and can certify that they will satisfy certain properties of a trusted node. These certifications can be in the form of a public key certificate that the manufacturer provides to the network for example. Transactions by a hardware mechanism can then use this key to sign off on a transaction. In an example, a network can limit transactions to only a subset of public keys that satisfy the consortiums requirements.

In another example, generation of a valid transaction can be linked to production of a cryptographic proof that is produced in a trusted node. An example could be an encrypted program that produces valid proofs but can only be executed in a secure execution environment or enclave.

Therefore, policy controlled enforcement over distributed digital ledger operations can be carried out on a node in a way that does not, for example, require heavy proof-of-work protocols but in a way that allows an appropriate level of trust to be placed in the operation of nodes allowed to carry out operations.

FIG. 1 is a schematic representation of a system according to an example. In the system 100 of FIG. 1, a network of nodes comprises a distributed digital ledger control apparatus node 101 and multiple (n) nodes 103-105. Each node 101, 103-105 can store a copy of a distributed digital ledger in a memory. A cryptographic key 107, stored at the node 101, is used to update or modify the ledger, which can be a blockchain for example. For example, hashes of transactions can be generated using the key, and these can be stored as part of a block along with a copy of the hash of a previous block. Accordingly, access to the key 107 is central to the ability to be able to perform operations on the digital ledger, such as updating or modifying by adding blocks for example.

According to an example, the node 101 can remotely establish trust in a node 103-105 in order to regulate access to a cryptographic key 107 used to enable modification of the distributed digital ledger according to a policy 109 maintained by control apparatus node 101. Put another way, a node 103-105 can modify the distributed digital ledger 111 using the key 107 when it has satisfied certain criteria provided in the policy 109, thereby enabling release of the key 107 by node 101.

Policy 109 can be a policy that is generated by a consortium of interested parties for example, and which specifies certain criteria or parameters that a node should adhere to or be able to demonstrate that it complies with before it is given access to the key 107 that can be used to modify the ledger 111. For example, as described above, policy 109 can specify that, in order to use the key 107, a node should be running a certain, fully patched, version of an operating system and only generate information relating to a transaction in a secure execution environment.

Figure 2:
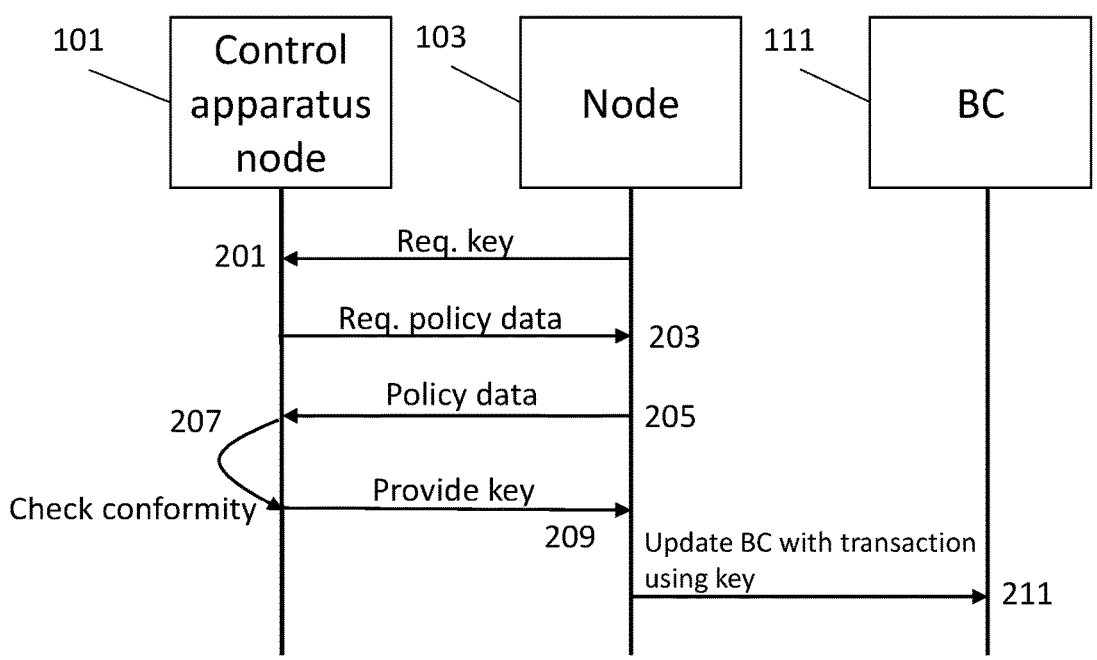
FIG. 2 is a schematic representation of message flow in a system as shown in FIG. 1, according to an example.

FIG. 2 is a schematic representation of message flow in a system as shown in FIG. 1, according to an example. A node, such as node 103 for example, can send a request 201 to node 101 for the key 107 so that it can update BC 111. In response to the request 201, the node 101 can request 203 policy data from node 103. The request 203 can be in response to request 201 or can be made at the time the node 103 joins the network for example.

In an example, the node 103 can respond to the request 203 with policy data 205 specifying certain parameters of the node 103, as described above. For example, the node 103 can provide data specifying the status of an operating system and/or node hardware. As described above, the data can indicate whether the node is able to use a secure enclave in order to store and/or process data, and so on.

The node 101 checks conformity (207) of the policy data 205 provided by node 103 against policy 109. If node 103 fulfils certain criteria as set out in the policy 109, the node 101 can provide (209) the cryptographic key 107 to node 103, or otherwise allow access to the key 107 by node 103. Node 103 can now modify (211) the digital ledger 111 using the key 107. For example, node 103 can add records to BC 111.

Figure 3:
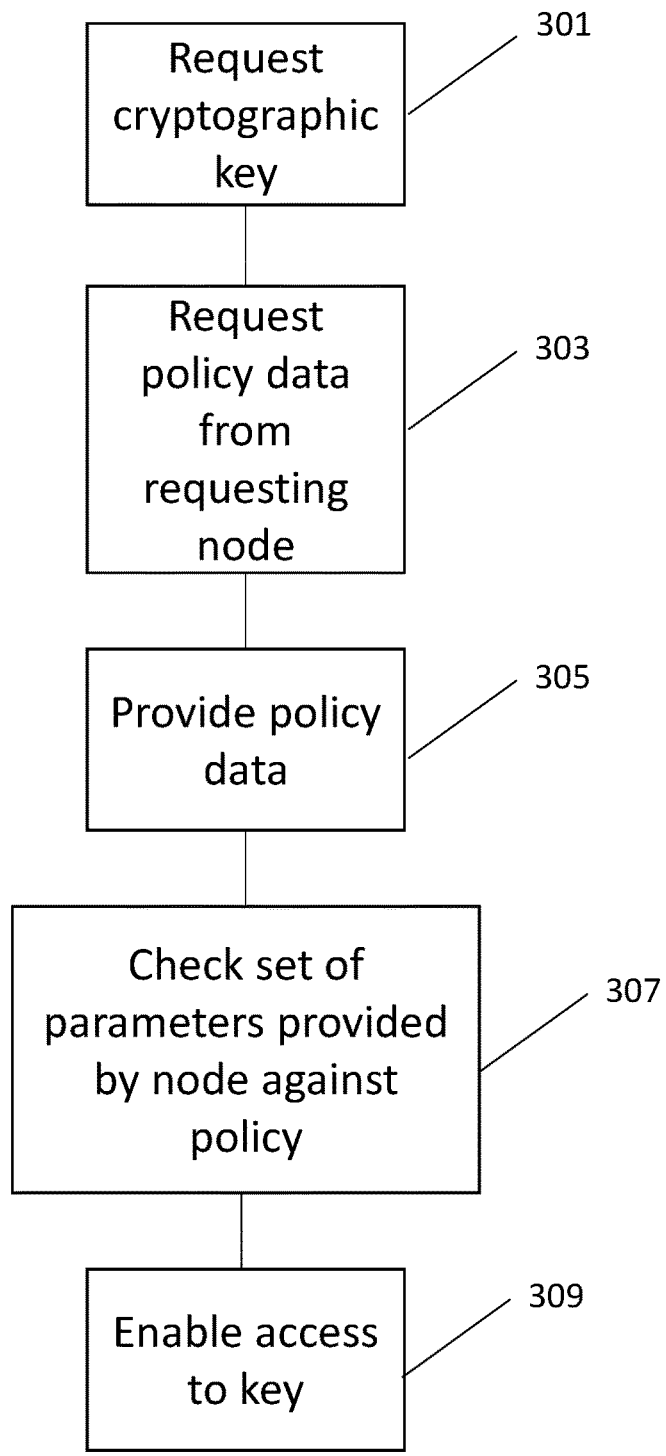
FIG. 3 is a flowchart of a method according to an example.

FIG. 3 is a flowchart of a method according to an example. More particularly, block 301 of FIG. 3 is a flowchart of a method for regulating modification of a distributed digital ledger at a node according to an example. The distributed digital ledger can be in the form of a blockchain, in which blocks of records are cryptographically linked to one another, as described above for example.

In block 301, a request for a cryptographic key is made by a node in order to enable the node to modify the distributed digital ledger. Access to (or supply of) the cryptographic key is controlled by node 101 (FIG. 1). In order to release or provide access to the key, node 101 can request, in block 303, policy data from the requesting node 103-105 representing a set of parameters of the requesting node 103-105. In response to the request in block 303, the requesting node 103-105 can provide (block 305) policy data to node 101.

In block 307, node 101 can check the set of parameters provided by the requesting node 103-105 against the policy 109 to determine whether the requesting node 103-105 conforms with the policy 109. In block 309, access to the key is enabled. This can include transmitting the key from node 101 to node 103-105, or node 103-105 retrieving the key from the node 101.

Figure 4:
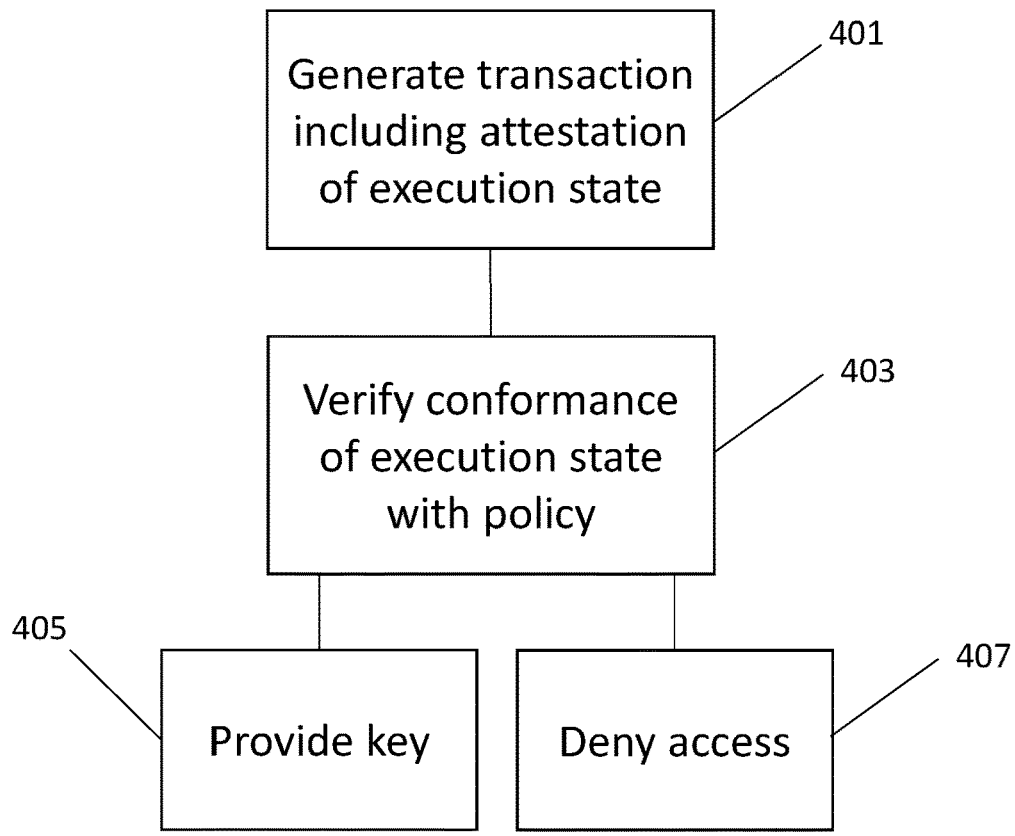
FIG. 4 is a flowchart of a method according to an example.

FIG. 4 is a flowchart of a method according to an example. In block 401, a node 103-105 generates a transaction including an attestation of an execution state of the node. For example, a node 103-105 can generate a transaction that is to form part of a record that will be part of a block in a digital ledger such as a blockchain. The transaction can, for example, provide information on a financial operation, or indeed any other operation that has been executed by the node 103-105. As part of the transaction, the node 103-105 can include data representing an attestation of its execution state. As described above, this can include information representing a hardware state of the node, an operating system that is executing, provision of secure execution environments and so on. In block 403, node 101 verifies whether the data representing an attestation of the node's 103-105 execution state conforms with the policy. That is, node 101 determines whether the node 103-105 is in conformity with the policy in order to enable it to control access to the cryptographic key used to enable modification of the distributed digital ledger.

In block 405, if the node does conform, the key can be provided (or access can be granted). Otherwise (block 407), access to the key is not granted.

According to an example, a transaction request can be created and certified by a node 103-105. This transaction is not yet part of the digital ledger 111. The node 101 can receive the certified transactions from the nodes 103-105 and order them into a block to be appended to a local copy (at the node 101) of the ledger 111. This can then be shared with other nodes in order to "publish" the latest updated BC 111.

In an example, a node 103-105 can be trusted to perform the relevant operations noted above. For example, a node 103-105 can be provided with a private key (which never leaves the node) and other nodes are provided with the public certificate of this node, which they know to trust. As trust is placed into the node, it can be checked/remotely attested to. In an example, a node can receive a certified transaction, validate it according to predefined rules and them it into a block. As such, node 101, for example, can receive some transactions that are not valid and can therefore reject them if at least one condition/rule is not met Examples in the present disclosure can be provided as methods, systems or machine-readable instructions. Such machine-readable instructions may be included on a computer readable storage medium. The storage medium can include one or multiple different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus or nodes may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 5:
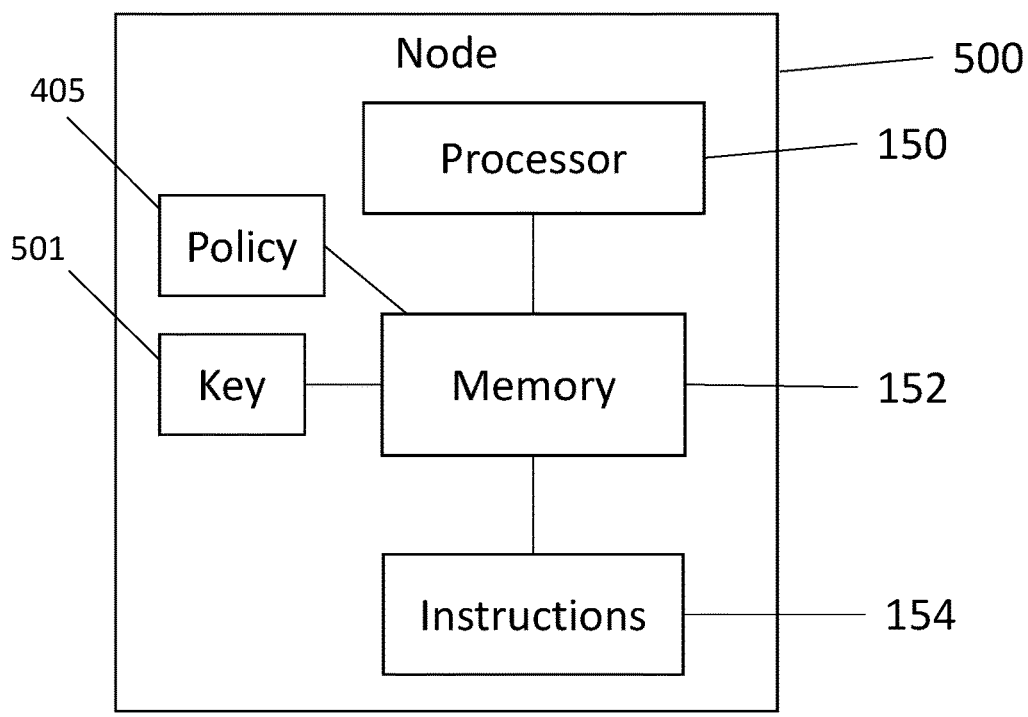
FIG. 5 shows an example of a processor of a node, associated with a memory, according to an example.

FIG. 5 shows an example of a processor 150 of a node 500, associated with a memory 152. In an example, node 500 can be the control apparatus node 101.

The memory 152 comprises computer readable instructions 154 which are executable by the processor 150. The instructions 154 comprise instructions to, at least: control access to a cryptographic key 501 (such as key 107 for example) used to enable modification of the distributed digital ledger according to a policy 503 maintained by at least one owner of the distributed digital ledger, and instructions to: request policy data from the first node representing a set of parameters of the first node, and enable access, from the second node, to a cryptographic key stored at the first node. Instructions to check the set of parameters of the node against the policy to determine that the node conforms with the policy. Instructions to attest to the validity of a cryptographic proof generated using a secure execution environment of the second node. Instructions to verify conformance of an attestation included in a transaction generated at the second node and representing an execution state of the second node with the policy.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for regulating modification of a distributed digital ledger at a first node, the method comprising:
 receiving, from the first node at a second node comprising a hardware processor, a request for access of a cryptographic key;
 in response to the request, determining, at the second node, whether policy data received from the first node satisfies a policy, wherein the policy data refers to one or a combination of an operating system (OS) version and a secure hardware of the first node, and the policy specifies criteria relating to one or a combination of the OS version and the secure hardware of the first node; and
 controlling, by the second node based on whether the policy data satisfies the policy, access to the cryptographic key by the first node to use when modifying the distributed digital ledger, wherein use of the cryptographic key by the first node when modifying the distributed digital ledger allows for a modification of the distributed digital ledger without a community check for accepting the modification of the distributed digital ledger.

2. The method of claim 1, further comprising:
 requesting, by the second node, the policy data from the first node; and receiving, by the second node from the first node, the policy data.

3. The method of claim 1, wherein the policy data satisfying the policy indicates that the secure hardware of the first node is able to establish a secure execution environment at the first node.

4. The method of claim 1, wherein the controlling of the access to the cryptographic key comprises transmitting, by the second node, the cryptographic key to the first node.

5. The method of claim 1, further comprising:
generating a transaction including an attestation of an execution state of the first node; and
verifying conformance of the attestation with the policy.

6. The method of claim 1, further comprising:
checking a certificate received from the first node representing node hardware parameters; and
enabling modification of the distributed digital ledger by the first node.

7. The method of claim 1, further comprising:
generating a cryptographic proof using a secure execution environment of the first node; and
attesting to a validity of the cryptographic proof.

8. A first node comprising:
a processor; and
a non-transitory storage medium storing instructions executable on the processor to:
receive, at the first node from a second node, a request for access of a cryptographic key;
in response to the request, determine, at the first node, whether policy data received from the second node satisfies a policy relating to access of the cryptographic key for use in modifications of a distributed digital ledger, wherein the policy data refers to one or a combination of an operating system (OS) version and a secure hardware of the second node, and the policy specifies criteria relating to one or a combination of the OS version and the secure hardware of the second node; and
in response to determining that the policy data referring to one or a combination of the OS version and the secure hardware of the second node satisfies the policy, send, from the first node to the second node, the cryptographic key for use when modifying the distributed digital ledger by the second node, wherein use of the cryptographic key by the second node when modifying the distributed digital ledger allows for a modification of the distributed digital ledger without a community check for accepting the modification of the distributed digital ledger.

9. The first node of claim 8, wherein the instructions are executable on the processor to:
receive a transaction including an attestation of an execution state of the second node; and
verify conformance of the attestation with the policy.

10. A non-transitory machine-readable storage medium comprising instructions that upon execution cause a first node to:
request policy data from a second node representing a set of parameters of the second node, wherein the set of parameters comprises a first parameter referring to an operating system (OS) version of the second node, and a second parameter referring to a secure hardware of the second node;
determine, based on the set of parameters, whether the second node is to be provided with access of a cryptographic key; and
in response to determining based on the set of parameters that the second node is to be provided with the access of the cryptographic key, send from the first node to the second node, the cryptographic key stored at the first node, wherein the cryptographic key enables the second node to modify a distributed digital ledger, wherein use of the cryptographic key by the second node when modifying the distributed digital ledger allows for a modification of the distributed digital ledger without a community check for accepting the modification of the distributed digital ledger.

11. The non-transitory machine-readable storage medium of claim 10, wherein the instructions upon execution cause the first node to:
attest to a validity of a cryptographic proof generated using a secure execution environment of the second node.

12. The non-transitory machine-readable storage medium of claim 10, wherein the instructions upon execution cause the first node to:
verify conformance of an attestation included in a transaction generated at the second node and representing an execution state of the second node with a policy.

13. The first node of claim 8, wherein the policy data satisfying the policy indicates that the secure hardware of the second node is able to establish a secure execution environment at the second node.

14. The non-transitory machine-readable storage medium of claim 10, wherein the policy data satisfying a policy indicates that the secure hardware of the second node is able to establish a secure execution environment at the second node.

* * * * *